Jan. 15, 1963   J. J. PAKAN   3,074,035
TUNABLE FILTER

Filed April 18, 1958   4 Sheets-Sheet 1

Inventor
John J. Pakan
By:
Graf, Nierman & Burmeister
Attorneys

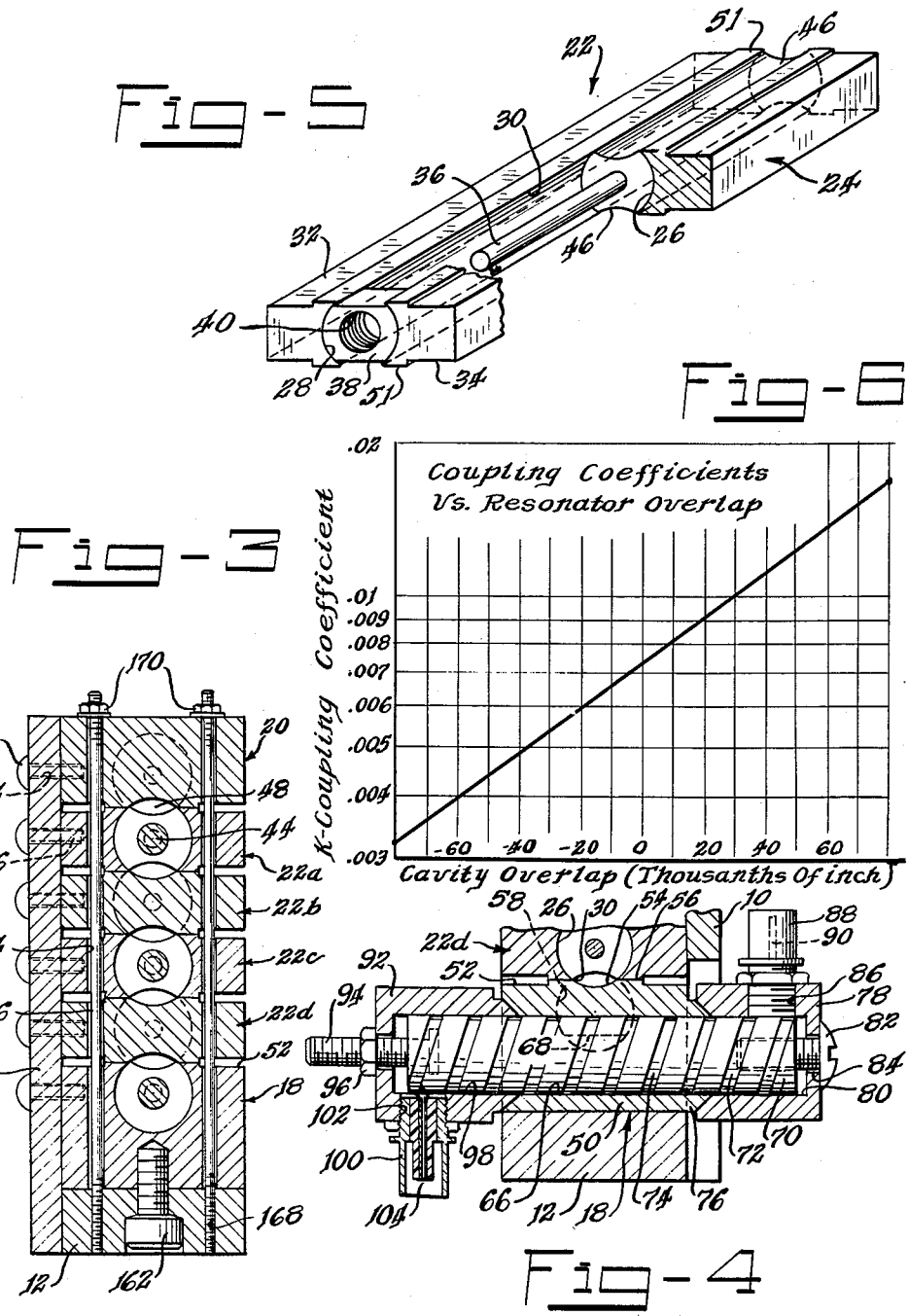

Experimental Filter Response
(Under one set of Conditions)

Filter Resonator Tuning Characteristic

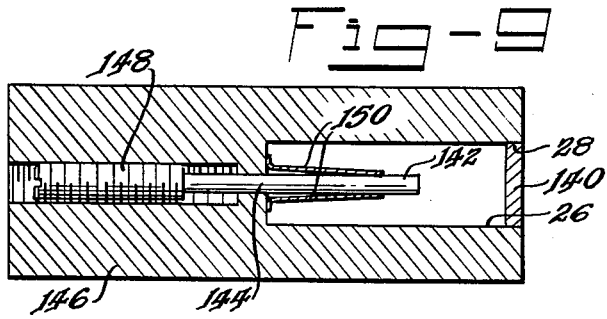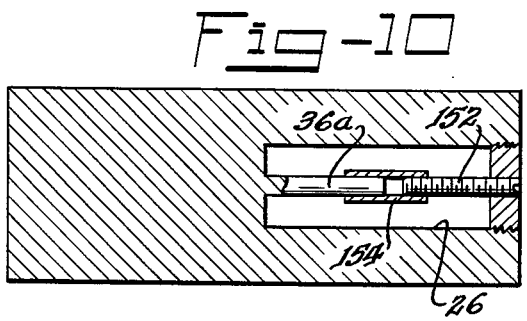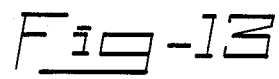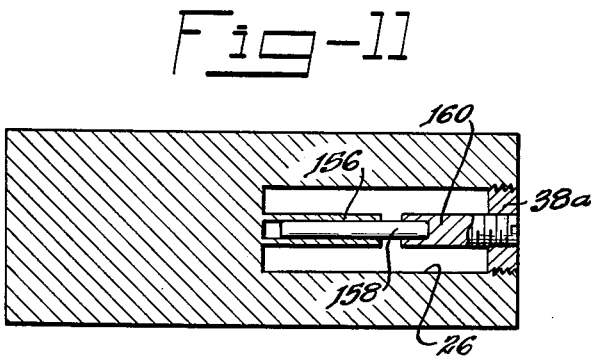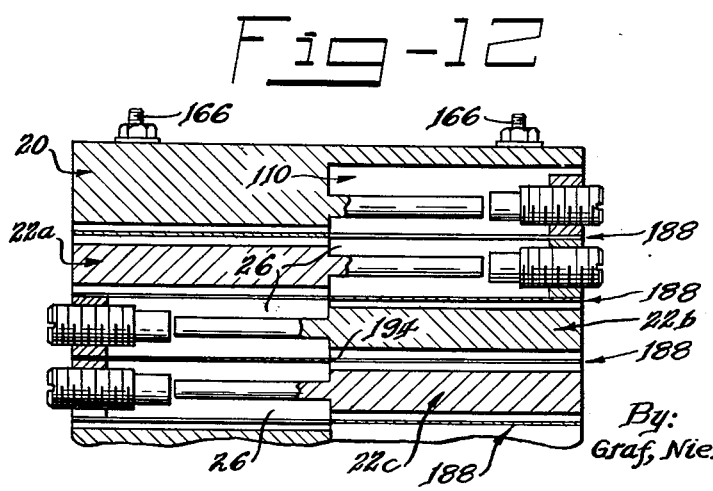

United States Patent Office 3,074,035
Patented Jan. 15, 1963

3,074,035
TUNABLE FILTER
John J. Pakan, Elmwood Park, Ill., assignor to A. R. F. Products, Inc., River Forest, Ill., a corporation of Illinois
Filed Apr. 18, 1958, Ser. No. 729,272
11 Claims. (Cl. 333—73)

The present invention relates to frequency selective filters and particularly to filters for use at microwave frequencies.

It is desirable in some applications to connect a filter to a transmission line which will segregate a particular frequency range. Under some circumstances, it is desirable to branch off from a transmission line a particular band of frequencies, and in other instances it may be desirable to attenuate a particular band of frequencies. The filter to be described herein is suitable for such applications.

In order to design a filter which will have a particular set of electrical characteristics, the mechanical parameters of the filter are conventionally calculated before construction of the filter. Thereafter, the filter is constructed with these mechanical parameters, and the mechanical parameters are varied to bring the electrical results of the filter to closer agreement with the desired results. Since microwave filters require precise workmanship, this is a costly and time consuming procedure. Accordingly, it is one of the objects of the present invention to provide a microwave filter which may be tuned to experimentally produce the desired electrical characteristics.

A tunable microwave filter is desirable for the design of non-tunable filters, and may itself be employed to solve filtering needs.

Broadly speaking, a tunable filter constructed according to the teachings of the present invention employs a plurality of resonant cavities, and means to connect the cavities in cascade. Means are provided to vary the coupling coefficient between cavities, the input coupling coefficient, the output coupling coefficient, and the resonant frequency of each of the cavities.

A more complete understanding of the present invention may be had from a further reading of this disclosure, particularly when viewed in the light of the drawings, in which:

FIGURE 3 is a sectional view taken along the line 3—3 of FIGURE 1;

FIGURE 4 is a sectional view taken along the line 4—4 of FIGURE 1;

FIGURE 5 is an elevational view, partly broken away and in section, one of the coaxial resonators of the filter;

FIGURE 6 is a graph illustrating the relationship of the coupling coefficient between adjacent resonators and the amount of overlap between adjacent cavities;

FIGURE 9 is a sectional view of a coaxial resonator which is a modified form of the resonator illustrated in FIGURES 1 through 5;

FIGURE 10 is another modification of a resonator which may be used in the present invention;

FIGURE 11 is still another modification of a coaxial resonator suitable for use in the present invention;

FIGURE 12 is a modified tunable filter constructed according to the present invention; and FIGURE 13 is an elevational view of the shield plate employed in the tunable filter illustrated in FIGURE 12.

Figure 1:
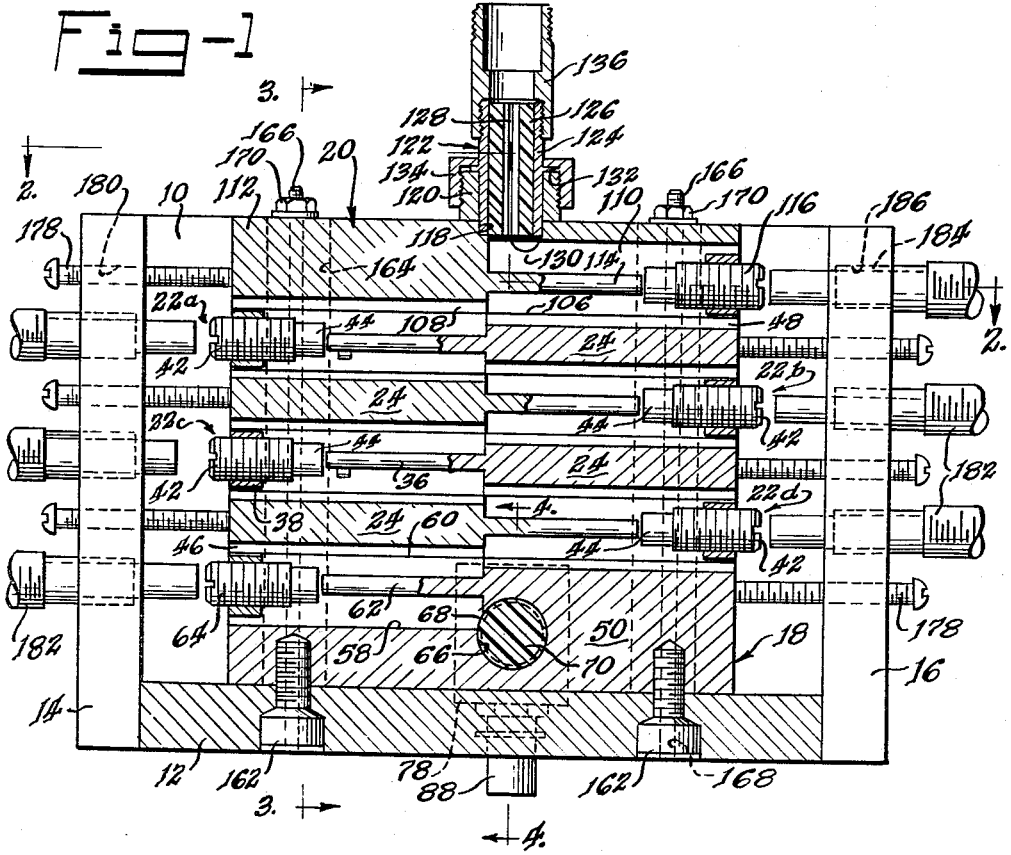
FIGURE 1 is a sectional view of a tunable filter constructed according to the teachings of the present invention.

In the particular embodiment of the present invention which is illustrated in the FIGURES 1 through 5, the resonator is mounted on a support member which has a flat plate 10, a front wall 12 extending normally from one edge of the plate 10, and side strips 14 and 16 which extend from the edges of the plate 10 normal to the wall 12. One end resonator 18 is mounted to the support member on the plate 10 abutting the wall 12, and this end resonator 18 is employed as the input to the tunable filter. A second end resonator 20 is mounted to the plate 10 parallel to the resonator 18 and spaced therefrom. This end resonator 20 is employed as the output resonator, although it is to be understood that input and output could be reversed if the application required. Between the input and output resonators 18 and 20, respectively, are disposed a plurality of identical interior resonators, four being illustrated in the drawings and designated 22a, 22b, 22c, and 22d, respectively.

Since the input and output resonators 18 and 20 are modifications of the interior resonators 22, the interior resonators 22 will first be described. As illustrated in FIGURES 1, 2, 3 and 5, the interior resonators 22 have blocks 24 which are quadrangular in shape. The blocks 24 are provided with a generally cylindrical cavity 26 which extends therein along the major axis of the block 24 from a mouth 28. The diameter of the cavity 26 is greater than the thickness of the block 24, thus forming elongated rectangular slots 30 in the two broad sides 32 and 34 of the block 24. The cavity 26 extends only part way along the axis of the block 24, in the embodiment illustrated this distance being one-half the length of the major axis of the block 24. A cylindrical rod 36 of a smaller diameter than the cavity 26 extends into the cavity coaxial with the major axis of the block 24 from the end of the cavity opposite the mouth 28. The rod 36 forms the axial electrode of the coaxial resonator, and, since the rod 36 is employed in the tuning means for the resonator, it extends only partially through the cavity 26.

A bearing block 38 is mounted in the mouth 28 of the block 24 and sealed thereto. The block 38 is provided with a threaded aperture 40 aligned with the major axis of the block 24, and an adjustment screw 42 threadedly engages the block 38. The adjustment screw 42 has a cylindrical portion 44 which confronts the end of the rod 36, and the capacity between the rod 36 and the adjustment screw 42 is used to tune the cavity to the desired frequency.

The block 24 is also provided with a pair of cylindrical indentations 46 which are disposed parallel to the major axis of the block 24 in the sides 32 and 34, respectively, and the indentations 46 extend from the slots 30 to the end of the block 24 opposite the mouth 28 of the cavity 26. A pair of flat protruding slide ways 51 extend along opposite edges of each of the indentations 46, and the slots 30 in straight lines, so that the contact between adjacent resonators 22 is formed by abutment of these protruding ways 51. The block 24 may be constructed of electrically conducting material, such as brass or aluminum. Due to the fact that microwave frequencies are employed, the block 24, rod 36, bearing block 38, and tuning screw 42 are preferably coated with silver. Since it is only necessary that the surfaces of the cavity and rod be conducting, it is possible to employ an electrically insulating material as a base for an electrically conducting coating, for example a plastic block 24 coated with silver.

In one particular construction of a tunable filter, which will be described throughout this disclosure, each of the interior resonators has a block 24 constructed of brass provided with a silver coating with dimensions of approximately 1½ inch by 7/16 inch by 4 inches. The cavity 26 has a diameter of approximately 5/8 inch and a length of approximately 2 inches measured from the end of the block 24. The rod 36 is approximately 1¼ inches long and has a diameter of approximately 9/16 inch. The diameter of the tuning screw is approximately 5/16 inch. The resonator tunes over a frequency from approximately 1.8 to 2.1 kilomegacycles.

As indicated in FIGURES 1 and 3, there are four interior resonators 22 disposed in abutting adjacent relationship. It is to be noted that the cavity 26 of each resonator confronts the indentations 46 of the adjacent resonators, thus forming the entire cylindrical resonator cavity. For this purpose, the indentations 46 have the same radius of revolution as the cavities 26. When all of the blocks 24 are oriented so that the inner ends of the cavities 26 are disposed upon a common plane, as indicated in FIGURE 1, the cavities 26 of the internal resonators 22a, 22b, 22c, and 22d are coupled together through the irises 48 which are formed by the groove 46 of one resonator and the confronting groove 46 of the adjacent resonator. If it is desired to reduce the coupling between adjacent resonators, the groove 46 of one resonator is made to partially confront the groove 46 of the adjacent resonator, thereby forming a channel through which the signal must pass.

The input resonator 18 is illustrated in FIGURES 1, 3 and 4. This resonator has a block 50 with the same length and width as the block 24 of the interior resonators but with a substantially greater thickness. The block 50 has a surface 52 which confronts the adjacent resonator 22d, and this surface 52 is provided with a cylindrical indentation 54 which has the same radius of curvature as the cavity 26 in the resonator 22d. The indentation 54 is aligned with the slot 30 of the resonator 22d and forms a portion of the cylindrical cavity thereof. The surface 52 of the block 50 is also provided with outwardly extending ridges 56 on opposite sides of the indentation 54 which extend in straight lines parallel to the axis of the block across the entire side thereof and abut the ridges 51 of the resonator 22d.

The groove 54 extends from one end of the block 50 to the center thereof, and a cylindrical cavity 58 extends into the block 54 from the opposite end of the block to the center of the block. This cavity 58 forms a single slot 60 between the ridges 56 and confronting the indentation 46 of the adjacent internal resonator 22d. A cylindrical rod 62, identical with the rods 36, extends into the cavity 58 along the axis thereof, and a tuning screw 64 is mounted in the mouth of the cavity 58 and confronts the end of the rod 62 in a manner similar to the internal resonators 22.

A cylindrical channel 66 extends through the block 50 normal to the major axis thereof and normal to the plate 10 of the supporting structure. The axis of the cylindrical channel 66 is disposed on a plane which is tangent to the cylindrical cavity 58 in the block 50, and the axis of the channel 66 is displaced from the inner end of the cavity 58 by a distance less than the radius of the channel 66 in order to form a small opening 68 in the end of the cavity 58, the opening having a straight edge adjacent to the rod 62 and a curved edge conforming to the cavity 58 connecting to the straight edge as illustrated in FIGURE 4. This opening 68 forms an iris for the introduction of signals into the inlet end resonator.

A rod 70 of electrically insulating material, such as polyethylene, is disposed within the channel 66 and fits snugly therein. The rod 70 extends from both ends of the channel 66, and is provided with a helical groove 72 along its length. A strip 74 of electrically conducting material is disposed within the groove 72, and one portion of the strip 74 confronts the opening 68 to the cavity 58, thus transmitting energy into the inlet end resonator 18. The block 50 is provided with an outwardly extending collar 76 coaxially disposed about the channel 66, and a fitting 78 is disposed in contact with the collar 76. The fitting 78 has a cavity 80 extending therein which accommodates the rod 70, and the fitting 78 is secured to the rod 70 by a bolt 82 threadedly engaged within the rod 70 and extending through an aperture 84 in the fitting 78. The fitting 78 also has an opening 86 disposed normal to the axis of the rod 70, and a transmission line connector 88 is threadedly engaged within the opening 86. The connector 88 has a center electrode 90 which is electrically connected to the helical electrically conducting strip 74.

A second end fitting 92 is secured to the other end of the rod 70 by a bolt 94 which extends from the rod 70 and a nut 96. The end fitting 92 also has a cylindrical cavity 98 which houses this end of the rod 70. A coaxial transmission line connector 100 is also threadedly mounted within an opening 102 disposed normal to the rod 70, and the center conductor 104 of the connector 100 is in contact with the strip 74 and thus electrically connected thereto.

The adjustable filter is connected in shunt with a transmission line by connecting one portion of the line to the connector 100 and the other portion of the line to the connector 88. The body 50 of the end resonator 18, the end fitting 78 and the end fitting 92 form the outer conductor of the transmission line, and the helical strip 74 the inner conductor for the portion of the line passing through the tunable coupler. The coupling between the first resonator 18 and the transmission line may be varied by rotating the rod 70 relative to the input resonator 18, in this manner the portion of the helical strip 74 confronting the iris 68 will be changed to increase or decrease the coupling.

Figure 2:
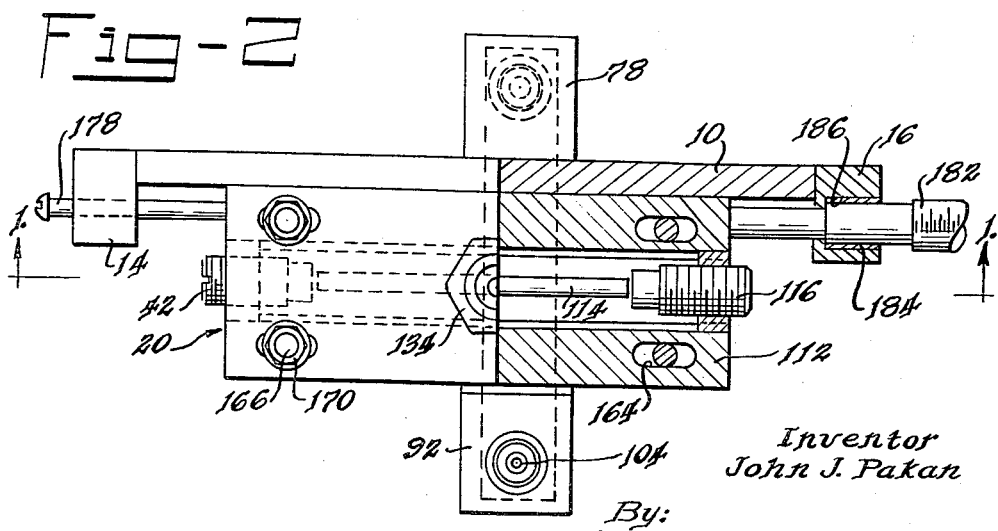
FIGURE 2 is a view of the tunable filter illustrated in FIGURE 1 taken along the line 2—2 of FIGURE 1, showing the filter partly in elevation and partly in section, FIGURE 2 also indicating the section of FIGURE 1.

As illustrated in FIGURES 1 and 2, the end filter 20 also has a flat surface 106 which confronts the adjacent interior resonator 22a. A partially cylindrical groove 108 is disposed in the surface 106 and is aligned with the confronting cavity 26 of the resonator 22a. In a manner identical with the end resonator 18, a cylindrical cavity 110 extends into the block 112 of the resonator 20 to the central plane of the resonator. A rod 114 extends axially into the cavity 110 from the central plane, and an adjusting screw 116 is threadedly mounted in the opening of the cavity 110.

An aperture 118 extends from the cavity 110 through the surface of the block 112 opposite the surface 106. This opening 118 is aligned with the axis of the cavity 110 adjacent to its inner end. A sleeve 120 extends outwardly from the opening 118, and a rotatable coupler 122 is disposed within the sleeve 120. The coupler 122 has an outer sleeve 124 of electrically conducting material, an inner sleeve 126 of electrically insulating material, and an inner conductor 128 disposed along its axis. A loop 130 of electrically conducting wire extends between the inner conductor 128 and the outer sleeve 124 within the cavity 110, thereby forming a coupling means to the cavity 110. The outer sleeve 124 has an outwardly extending flange 132, and a cap 134 engages the flange 132 and is threadedly engaged to the outer periphery of the sleeve 120, thus locking the coupler 122 to the end resonator 20. A coaxial fitting 136 may be attached to the end of the coupler 122.

By loosening the cap 134, the coupler 122 may be rotated within the sleeve 120, thus changing the orientation of the loop 130 relative to the axis of the cavity 110 and altering the coupling between the cavity 110 and the transmission line connected to the coupler 122.

It is clear from the foregoing disclosure, that the coupling between the transmission line and the input end resonator 18 may be varied, and the coupling between the output end resonator 20 and the output transmission line may also be varied. FIGURE 6 illustrates the permissible variation in coupling between the interior resonators 22. As indicated in the figure, the coupling between adjacent interior resonators 22 may be increased by sliding the resonators relative to each other from a plane in which the inner ends of the resonators lie on a common plane to cause the cavities 26 of the resonators to overlap. Also, the coupling may be decreased by sliding the resonators in the opposite direction relative to each other to cause the cavities to be interconnected only by a channel between the grooves 46.

Figure 8:
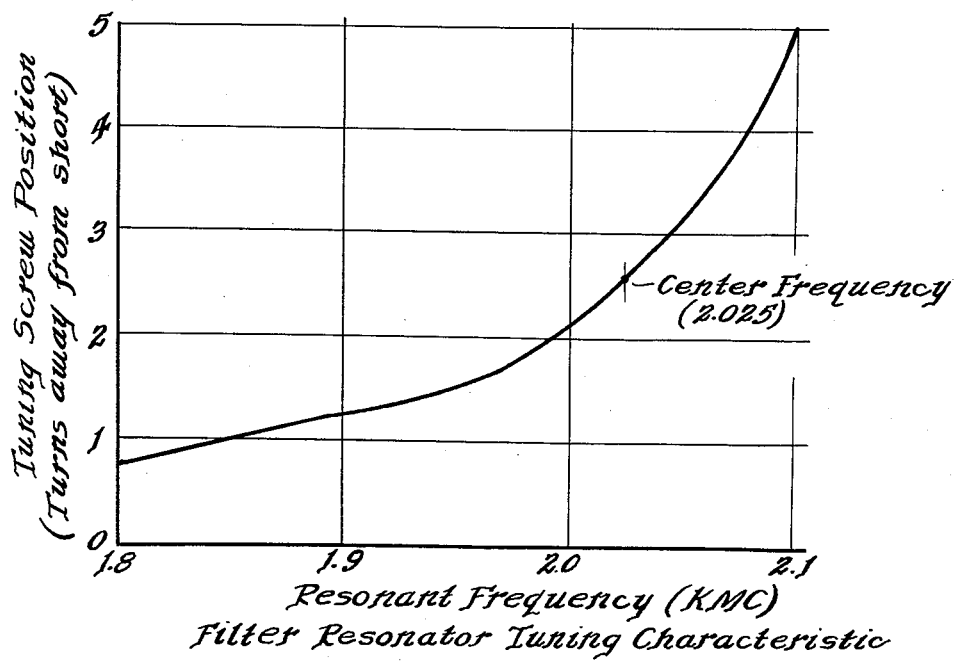
FIGURE 8 is a graph illustrating the relation between the tuning screw positions in turns away from the electrical short position and the resonant frequency of the resonator.

FIGURE 8 illustrates the frequency range over which each of the resonators may be varied by adjustment of the screw 42 or 116. As will be described hereinafter, the frequency range may be increased by modifications in the construction of the resonators.

Figure 7:
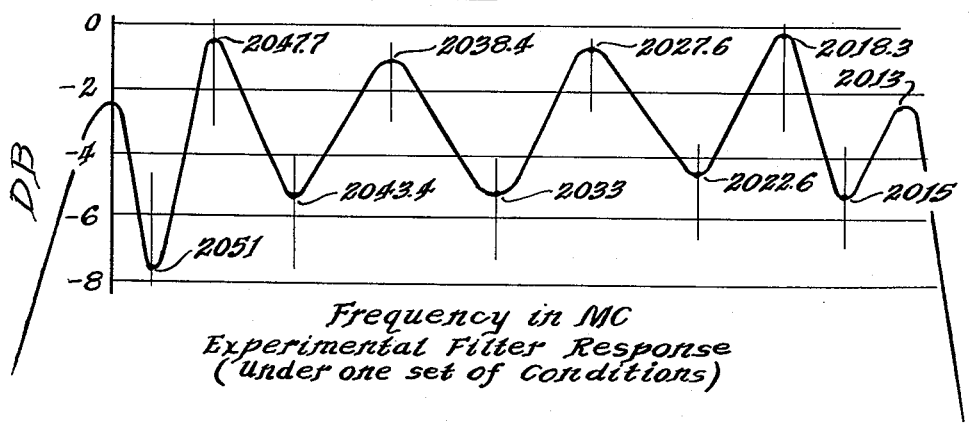
FIGURE 7 is a graph illustrating the attenuation of the filter over a frequency range for a given embodiment of the filter adjusted in a particular manner.

It is possible to adjust the tunable filter either to pass a broad range of frequencies and discriminate against all others or to pass a narrow range of frequencies and discriminate sharply against all others. In the latter case, all of the resonators would be adjusted to approximately the same frequency. A broad range of frequencies may be passed by the resonator, as illustrated in FIGURE 7, by adjusting the frequency of each resonator differently to produce a broader distribution. In the example of FIGURE 7, the selectivity is such that the 60 db bandwidth is only twice the 3 db bandwidth (taken outside of the end peaks). This is possible since both the coupling coefficients and the frequency of each resonator are independently adjustable.

Only a limited range of frequency adjustment is possible for the resonators by employing an electrically conducting screw adjustably positioned relative to the end of the rod 36. FIGURE 9 illustrates a modified resonator which will permit a broader range of adjustment. In this modification, the mouth 28 of the cavity 26 is closed by a solid electrically conducting wall or member 140, and the rod 36 is replaced by a shaft 142 which is translatably disposed within a bore 144 extending through the block, designated 146, as an extension of the axis of the cavity 26. The rod 142 is provided with outwardly extending threads 148 at its end opposite the cavity 26, and these threads engage threads on the bore 144. In this manner, the rod may be screwed into and out of the cavity 26 over a wide range. Electrically conducting fingers 150 are mounted at the inner end of the cavity 26 and are spring biased against the rod 142.

FIGURE 10 illustrates another modification of a resonator which is tunable over a wide frequency range. In this modification, the resonator is identical to that shown in FIGURE 5, with two exceptions. First, the rod, designated 36a, is shorter than the rod 36, and second, the tuning screw has been replaced by a threaded dielectric rod 152 having an electrically conducting cylinder 154 secured about its end and slidably disposed over the rod 36a. The cylinder 154 is capacitively coupled to the rod 36a.

Another construction which results in a resonator tunable over a broad frequency range is illustrated in FIGURE 11. In this construction, a hollow electrically conducting cylinder 156 extends coaxially about the axis of the cavity 26 from the inner end thereof. An electrically conducting rod 158 is capacity coupled to the cylinder 156 and translatable along the axis thereof. The rod 158 is secured at its outer end to a dielectric rod 160 which is threadedly engaged within a bearing mount 38a, similar to that illustrated in FIGURE 5.

After the tunable filter has been adjusted to have the desired electrical properties, it is desirable that the filter resonators 18, 20, and 22 be locked in position. As indicated in FIGURES 1 and 3, the input resonator 18 is secured to the front wall 12 of the support member by a pair of screws 162. Also, each of the blocks 24, 50, and 112 are provided with elongated slots 164 disposed parallel to the plate 10 and adjacent to the four corners of the blocks. Four rods 166 extend through the slots 164 and are threadedly anchored in bores 168 in the wall 12. The rods 166 extend outwardly from the output resonator 20, and are provided with threads which accommodate nuts 170. Screws 172 also extend through slots 174 in the support plate 10 and are threadedly engaged within bores 176 in the resonators 20, 18, and 22.

For many applications, such as the broad band pass filter application illustrated in FIGURE 7, it is desirable to calculate the coupling coefficients between adjacent resonators, and the resonant frequency desired for each resonator, and after knowing these values to adjust the tunable filter to approximate the calculated performance. The resonant frequency of each of the resonators may be tuned as indicated above, and the coupling coefficients between adjacent resonators may be approximated by adjusting the resonators relative to each other according to the predetermined displacement required for the particular coupling coefficient to be obtained, for example, in accordance with the data set forth in FIGURE 6 for the particular embodiment described throughout this disclosure. In order to accurately locate the position of each of the resonators relative to the adjacent resonators, an adjustable threaded screw 178 is threadedly engaged within a bore 180 in one of the end strips 14 or 16 and confronts one end of a resonator, each resonator having a screw 178 confronting one end thereof. The screw 178 is adjusted to push the resonator relative to the adjacent resonator. A screw micrometer 182 is mounted to confront the opposite end of each resonator from the screw 178. The micrometer 182 rests against a sleeve 184 disposed within a cylindrical aperture 186 through the end strip 14 or 16. By means of the micrometers and the screws, each of the resonators may be adjusted relative to adjacent resonators to provide the exact amount of overlap between cavities to produce the desired coupling coefficient.

FIGURES 12 and 13 illustrate another modification of the present invention. In the embodiment of the invention illustrated in FIGURES 1 through 5, the cavities 26 of the resonators confront the grooves 46 of adjacent resonators. In FIGURE 12, the resonators, which are identical to those illustrated in FIGURES 1 through 5 and bear the same reference numerals, are disposed with the cavities 26 thereof disposed to confront each other. A plate with electrically conducting surfaces, designated 188 and illustrated in FIGURE 13, is disposed between each of the resonators. The plate 188 is provided with an inwardly extending slot 190 from one end thereof which is disposed between the guide ways 51 of the confronting resonators. In other words, the slot 190 is aligned with the grooves 46 of the adjacent resonators. The plate 188 is also provided with a pair of cuts 192 on opposite sides of the slot 190, which are aligned with the rods 166 to permit the plate 188 to be translated between adjacent resonators and adjustable therebetween. The inner edge, designated 194, of the slot 190 is normal to the axis of the slot 190 and is adapted to be aligned with the shorted end of each of the cavities 26, 58, or 110.

With this construction, the plate 188 may be translated relative to the adjacent resonators to change the coupling coefficient therebetween. Further, the plate 188 forms a better isolation between adjacent resonators than the construction illustrated in FIGURES 1 through 5. Further, the two embodiments of the invention may be employed in a single tunable resonator, as illustrated in FIGURE 12. With this construction the cavities 110 and 26 of the resonator 20 and 22a are disposed to confront each other with the plate 188 disposed therebetween. Also, the resonators 22a and 22b are arranged with their cavities 26 confronting the grooves 46 of the adjacent resonator. The plate 188 may be employed between the resonators 22a and 22b to provide better isolation, or omitted as in FIGURES 1 and 3.

From the foregoing disclosure, those skilled in the art will readily devise many modifications of the present invention within the spirit thereof. It is, therefore, intended that the scope of the present invention be not limited by the foregoing disclosure, but rather only by the appended claims.

The invention claimed is:

1. A tunable filter comprising a plurality of coaxial resonators including means having a generally flat wall defining a cavity with electrically conducting surfaces, said cavity having an axial conductor disposed therein and connected to the surface of the cavity at one end, the wall of said cavity defining means having a groove therein extending from an opening in the cavity disposed adjacent to the junction of the rod and cavity surface, means for mounting the resonators in abutting relationship with the flat wall of one resonator abutting the flat wall of the other, said means mounting the grooves in confronting relationship and electrically coupling the cavities through the openings, and one resonator being translatable along the axis of the grooves relative to the other resonator.

2. A tunable filter comprising a plurality of solid generally rectangular bodies disposed with at least one of a pair of parallel sides abutting an adjacent body, each of said bodies having a cavity extending therein from one end between the parallel sides and slots in the parallel sides communicating with the cavity, each of said cavities being coupled electrically to an adjacent cavity through confronting slots, an electrically conducting rod disposed in the cavity forming a resonator with the cavity, said rod being mounted on the body opposite the end thereof, and means to vary the resonant frequency of the resonator, wherein the means to vary the resonant frequency of the resonator comprises an electrically conducting screw mounted to the body on the axis of the rod and electrically connected to the body, said screw being translatable to vary the distance between the screw and the rod.

3. A tunable filter comprising a plurality of solid generally rectangular bodies disposed with at least one of a pair of parallel sides abutting an adjacent body, each of said bodies having a cavity extending therein from one end between the parallel sides and slots in the parallel sides communicating with the cavity, each of said cavities being coupled electrically to an adjacent cavity through confronting slots, an electrically conducting rod disposed in the cavity forming a resonator with the cavity, said rod being mounted on the body opposite the end thereof, and means to vary the resonant frequency of the resonator, wherein the means to vary the resonant frequency of the resonator comprises an electrically conducting cylinder slidably disposed about the rod, a positioning member of electrically insulating material attached to the cylinder and extending to the exterior of the cavity, and mounting means secured to the body and coupled to the positioning member for translatably mounting the positioning member.

4. A tunable filter comprising a plurality of quadrangular blocks, each block having a generally cylindrical cavity extending therein from a mouth in one end of the block parallel to the axis of the block, said cavity having a diameter greater than the thickness of the block and forming slots in the sides of the block along the cavity, each of said blocks having a cylindrical rod of smaller diameter than the cavity extending from the block along the axis of the cavity and terminating at a point spaced from the end of the cavity, said blocks also having a concave indentation in each side thereof extending parallel to the cavity from the cavity to the end of the block opposite the mouth of the cavity, the length of said grooves being approximately equal to the length of the cavity, each of said blocks having electrically conducting surfaces defining the indentations, rod and cavity, and means for mounting the blocks in abutting relationship with the grooves of one block parallel to and at least partially confronting the slots of adjacent blocks.

5. A tunable filter comprising the elements of claim 4 wherein each of the cavities is provided with means for varying the resonant frequency of the cavity.

6. A tunable filter comprising the elements of claim 4 wherein one of the blocks is provided with a cylindrical aperture extending therethrough from the end of the cavity remote from the mouth, an electrically conducting sleeve rotatably disposed within the aperture, an electrical conductor disposed on the axis of the sleeve and electrically insulated from the sleeve, means for mounting the sleeve in the aperture including means to lock the sleeve from rotation relative to the body, and an electrically conducting loop disposed between the sleeve and conductor.

7. A tunable filter comprising a plurality of coaxial resonators including means having a generally flat wall defining a cavity with electrically conducting surfaces, said cavity having an axial conductor disposed therein and connected to the surface of the cavity at one end, the wall of said cavity defining means having a groove therein extending from an opening in the cavity disposed adjacent to the junction of the rod and cavity surface, means the mounting the resonators with the flat wall of one resonator disposed parallel to and adjacent the flat wall of another resonator, one resonator being translatable along the axis of the grooves relative to the other resonator, and an electrically conducting plate having a slot extending therein from one end disposed between the adjacent resonators and in contact therewith, the slot of said plate being aligned with the grooves of the resonators, whereby the cavity of one resonator is coupled to the cavity of the other resonators through the slot of the plate.

8. A tunable filter comprising a plurality of blocks having a cavity disposed therein, said blocks being mounted adjacent to each other and the cavities of adjacent blocks being electrically coupled to each other by confronting openings in the adjacent blocks, one of said blocks having a cylindrical aperture disposed between the cavity and the exterior of the block, an electrically conducting sleeve journalled within the aperture having a center conductor, and an electrically conducting loop disposed within the cavity between the center conductor and the sleeve, whereby a coaxial cable may be connected between the center conductor and the sleeve and the coupling between the cavity and the cable varied by rotation of the sleeve.

9. A tunable filter comprising a plurality of electrically conducting members having a pair of parallel generally flat surfaces, means for assembling the members in abutting relationship with a flat surface of each member in contact with a flat surface of the adjacent member, said members being translatable relative to each other along axes disposed in a common plane, each of said members defining a resonator cavity having an opening in a wall generally normal to the axis of translation of said member for coupling said resonator to an adjacent resonator, and the opening of each member confronting the opening of said adjacent member, the adjacent members also defining an electrically conducting channel between the confronting openings of said members and the length of said channel being adjustable by translation of the adjacent members relative to each other.

10. A tunable filter comprising the elements of claim 9 wherein the wall of a member is provided with two spaced openings and an axial conductor is mounted on the wall between the openings and extends into the cavity, each of the openings confronting an opening of an adjacent member and the adjacent members defining an electrically conducting channel between each of the openings and the opening of the adjacent members.

11. A tunable filter comprising a plurality of electrically conducting members having a pair of parallel generally flat surfaces, means for assembling the members in abutting relationship with a flat surface of each member in contact with a flat surface of the adjacent member, said members being translatable relative to each other along axes disposed in a common plane, each of said members defining a resonator cavity having an opening in a wall generally normal to the axis of translation of said member for coupling said resonator to an adjacent resonator, and the opening of each member confronting the opening of said adjacent member, the adjacent members also defining an electrically conducting channel between the confronting openings of said members and the length of said channel being adjustable by translation of the adjacent members relative to each other, and adjustable means for controlling the frequency of each of the resonators separately.

References Cited in the file of this patent

UNITED STATES PATENTS

| | | |
|---|---|---|
| 2,437,085 | Evans | Mar. 2, 1948 |
| 2,579,237 | Lund | Dec. 18, 1951 |
| 2,649,576 | Lewis | Aug. 18, 1953 |
| 2,749,523 | Dishall | June 5, 1956 |
| 2,862,191 | MacDonald | Nov. 25, 1958 |

OTHER REFERENCES

Griffin: abstract of Serial No. 658,941, published Nov. 13, 1951, 652 O.G. 616.